(12) United States Patent
Yamada et al.

(10) Patent No.: US 7,882,764 B2
(45) Date of Patent: Feb. 8, 2011

(54) STEERING WHEEL

(75) Inventors: Shuji Yamada, Numazu (JP); Takashi Tokita, Eaton, OH (US); Takeshi Fujimori, Fuji (JP)

(73) Assignee: Nihon Plast Co., Ltd., Shizuoka (JP)

( * ) Notice: Subject to any disclaimer, the term of this patent is extended or adjusted under 35 U.S.C. 154(b) by 750 days.

(21) Appl. No.: 11/779,566

(22) Filed: Jul. 18, 2007

(65) Prior Publication Data

US 2008/0018087 A1  Jan. 24, 2008

(30) Foreign Application Priority Data

Jul. 20, 2006  (JP) ............................ 2006-197567

(51) Int. Cl.
*B62D 1/04* (2006.01)
(52) U.S. Cl. ....................................................... 74/552
(58) Field of Classification Search ................... 74/552; 280/771, 775
See application file for complete search history.

(56) References Cited

U.S. PATENT DOCUMENTS

| 6,065,366 A | * | 5/2000 | Koyama et al. ............... 74/552 |
| 2003/0037633 A1 | * | 2/2003 | Grilli et al. ................... 74/552 |

FOREIGN PATENT DOCUMENTS

| EP | 1 066 985 A2 | 1/2001 |
| EP | 1 066 985 A3 | 5/2002 |
| EP | 1 285 839 A2 | 2/2003 |
| EP | 1 285 839 A3 | 2/2004 |
| JP | 6176536 A1 * | 4/1986 |
| JP | 6-98712 B2 | 12/1994 |
| JP | 10-203376 A | 8/1998 |
| JP | 2000-211530 A | 8/2000 |
| JP | 2006-218925 A | 8/2006 |

OTHER PUBLICATIONS

Chinese Office Action dated Oct. 23, 2009, corresponding to Chinese Patent Application No. 200710093292.8.

* cited by examiner

*Primary Examiner*—Vicky A Johnson
(74) *Attorney, Agent, or Firm*—Sughrue Mion, PLLC

(57) ABSTRACT

A steering wheel includes (a) a core member having a boss portion, a spoke portion, and a rim portion, the spoke portion stretching between the boss portion and the rim portion; and (b) a polyurethane member covering at least the rim portion of the core member, the polyurethane member having a specific gravity of 0.7 to 0.9 and a Shore A hardness of 45 to 60. A steering wheel proper defined as being a combination of the core member and the polyurethane member has a weight of 1.0 to 2.5 kg. This steering wheel is satisfied in both of weight reduction and maintenance of moment of inertia necessary for steering wheel.

9 Claims, 2 Drawing Sheets

STEERING WHEEL

BACKGROUND OF THE INVENTION

1. Field of the Invention

The present invention relates to a steering wheel that is light in weight and is provided with a moment of inertia that is necessary for steering wheels.

2. Description of the Related Art

Hitherto, it has been required to reduce the weight of a steering wheel as a part of reducing the weight of a vehicle in order to improve fuel consumption, etc. In view of this, there is proposed a steering wheel having a core member made by die casting of a light-weight alloy such as magnesium alloy (see Japanese Patent Application Laid-open Publication 10-203376). Furthermore, there is proposed a steering wheel core member made of a fiber-reinforced plastic (FRP) (see Japanese Patent Application Examined Publication 6-98712).

On the other hand, a steering wheel is also required to be high in moment of inertia.

Thus, in case that a steering wheel is made to be simply light in weight, its moment of inertia becomes too low. This may cause the steering wheel to have some problems. For example, it is pointed out in Japanese Patent Application Examined Publication 6-98712 that a light-weight steering wheel having an FRP core member tends to have a problem of circumferential vibration. To solve this problem, it is proposed therein to increase the weight of a rim portion of the steering wheel by winding a high specific gravity fiber (e.g., a metal wire) around the rim portion. This proposal, however, inevitably increases the steering wheel production cost, due to the necessity of additional facilities and the increase of the production steps.

Furthermore, there is a process of producing a conventional steering wheel (see FIGS. 3 and 4) by provisionally fixing an iron insert mass "c" to a rim portion of a core member "b" with an aluminum tape "d" and then by covering the rim portion with a normal polyurethane resin covering "e" having a specific gravity of less than 0.6. This iron insert mass "c" is used for increasing the weight of the rim portion. This process is also disadvantageous in terms of production cost, due to the increase of the parts and the production steps.

SUMMARY OF THE INVENTION

It is therefore an object of the present invention to provide a steering wheel that is satisfied in both of weight reduction and maintenance of a moment of inertia necessary for steering wheels, without necessity for additional facilities and without increase of the number of parts.

According to the present invention, there is provided a steering wheel comprising:

a core member having a boss portion, a spoke portion, and a rim portion, the spoke portion stretching between the boss portion and the rim portion; and a polyurethane member covering at least the rim portion of the core member, the polyurethane member having a specific gravity of 0.7 to 0.9 and a Shore A hardness of 45 to 60, wherein a steering wheel proper defined as being a combination of the core member and the polyurethane member has a weight of 1.0 to 2.5 kg.

As a result of an eager examination, the present inventors have found that the above object can be accomplished by using (a) a light weight material for the core member so that the steering wheel proper has a weight of 1.0 to 2.5 kg and (b) the special polyurethane member having a particular specific gravity of 0.7-0.9 and a particular hardness (i.e., a Shore A hardness of 45-60), for covering at least the rim portion of the core member.

According to the present invention, there is provided a process for producing a steering wheel, comprising the steps of:

(a) providing a core member having a boss portion, a spoke portion and a rim portion, the spoke portion stretching between the boss portion and the rim portion; and (b) conducting an injection molding by mixing a polyisocyanate component with a polyol component that contains a foaming agent and 3-5 wt % of a crosslinking agent, the foaming agent being in an amount such that 0.8-1.5 liters of a gas are generated from a urethane raw material by the mixing per kilogram of the urethane raw material, thereby generating a polyurethane member and simultaneously covering at least the rim portion of the core member with the polyurethane member.

BRIEF DESCRIPTION OF THE DRAWINGS

The object as well as the advantageous features of the invention will become apparent from the following description of the preferred embodiment taken in conjunction with the accompanying drawings, wherein.

DETAILED DESCRIPTION

Figure 1:
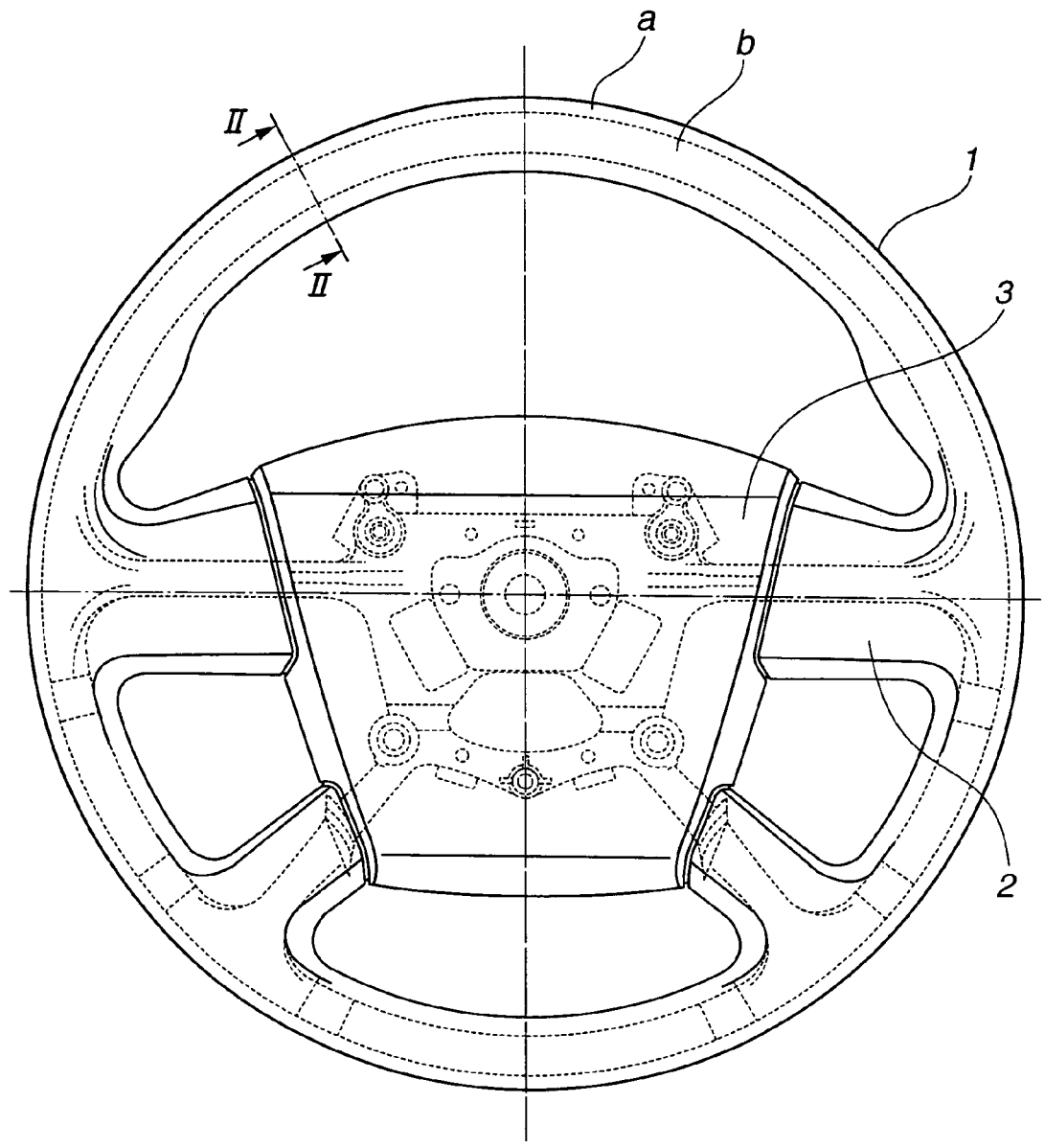
FIG. 1 is a schematic view showing a steering wheel according to an embodiment of the present invention.
Figure 2:
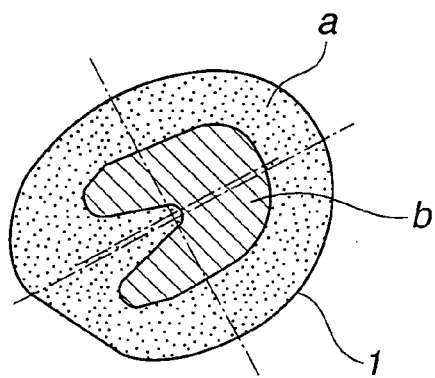
FIG. 2 is a sectional view taken along lines II-II of FIG. 1.
Figure 3:
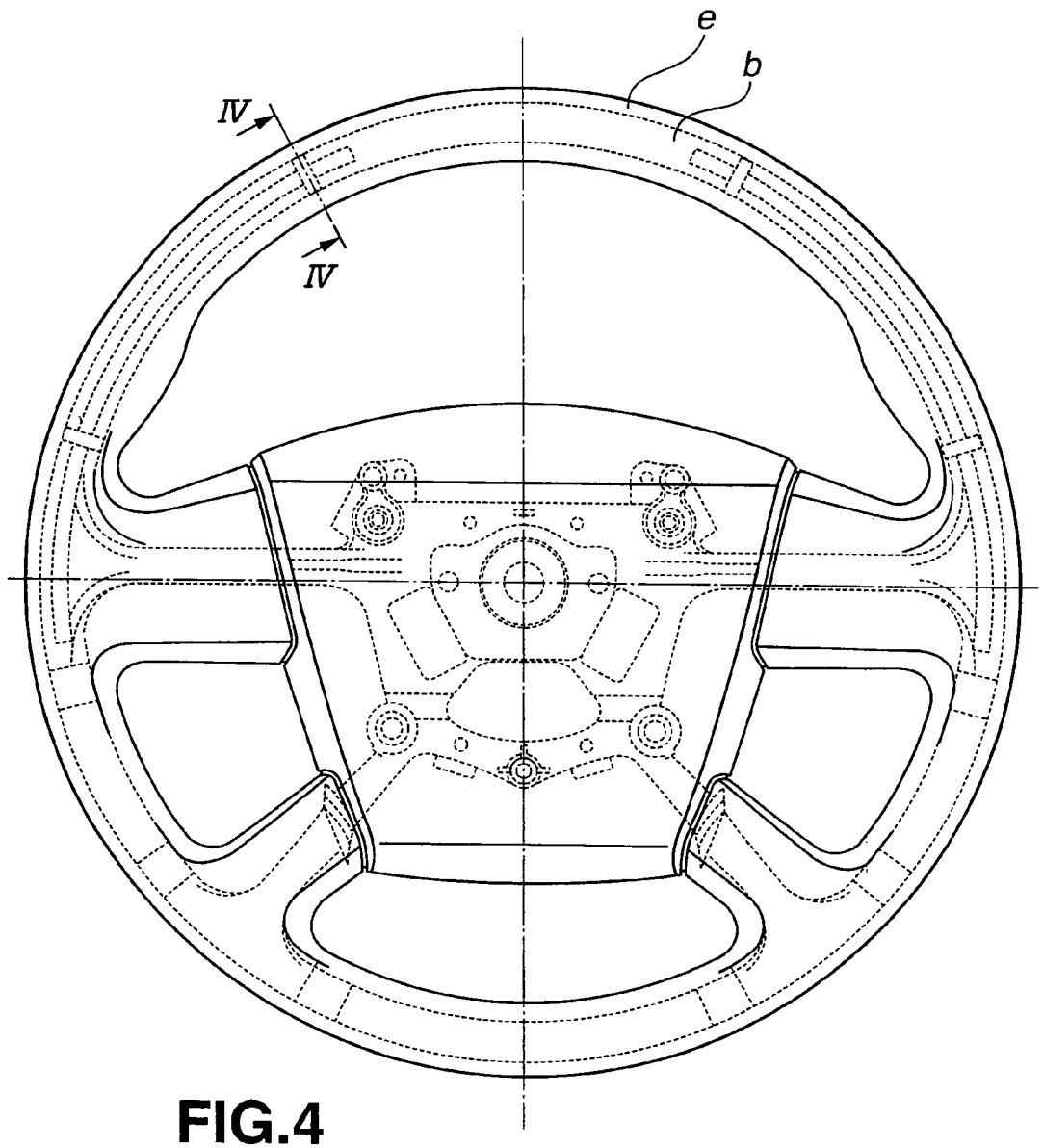
FIG. 3 is a schematic view showing a conventional steering wheel.
Figure 4:
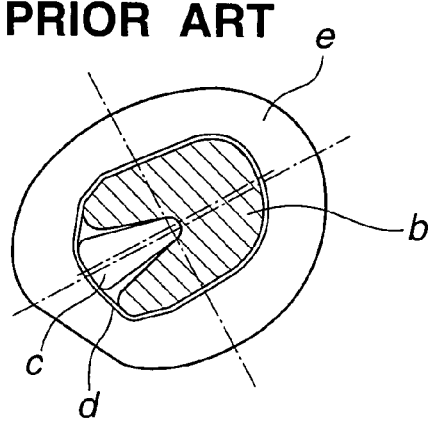
FIG. 4 is a sectional view taken along lines IV-IV of FIG. 3.

With reference to FIGS. 1 and 2, a steering wheel according to an embodiment of the present invention is exemplarily described in detail in the following.

As is seen from FIG. 1, a steering wheel includes a core member "b" having a rim portion 1, a spoke portion 2, and a boss portion 3. The spoke portion 2 stretches between the rim portion 1 and the boss portion 3. The steering wheel further includes a polyurethane member "a" covering at least the rim portion 1 of the core member "b" (see FIG. 2). This polyurethane member is a special polyurethane having a specific gravity of 0.7 to 0.9 and a Shore A hardness of 45 to 60.

As stated above, the steering wheel proper (i.e., a combination of the core member and the polyurethane member) has a weight of 1.0 to 2.5 kg, preferably 1.5 to 1.8 kg. It should be noted that an air bag module, which is to be mounted on the boss portion 3, is generally excluded from the steering wheel proper when the weight of the steering wheel proper is discussed. It is possible to make the steering wheel proper have a weight of 1.0 to 2.5 kg by using a suitable light-weight core member, even though the polyurethane member of the present invention has a relatively high specific gravity of 0.7-0.9.

As the light-weight core member, it is possible to use a material that is lighter than a normal cast iron. For example, it can be selected from (a) a cast product of a light alloy of magnesium, titanium, aluminum or the like, (b) a fiber-reinforced plastic, and (c) a pressed core member prepared by joining together pressed plate members. Of these, it is particularly preferable to use a magnesium alloy, which is easy for casting and superior in strength even though it is light in weight.

According to the present invention, it is possible to adjust moment of inertia of a light-weight steering wheel to a proper value by using the special polyurethane member, which covers at least the rim portion of the cover member. This is a very efficient way for adjusting moment of inertia of steering wheel. Thus, it is not necessary in the present invention to provide a complicated measure, for example, a fixation of a special member (a weight) to the rim portion. Furthermore, the polyurethane member of the present invention can provide a driver with a soft touch, even if it is heavy in weight.

As mentioned above, a light-weight core member is used in the present invention in order to make the steering wheel proper lighter in weight. This causes a necessity of adjusting or increasing inertia of moment of the steering wheel. This adjustment can be conducted by using only the special polyurethane member of the present invention. Thus, other constructions of the steering wheel are not particularly limited in the present invention and may be the same as those of conventional steering wheels.

Thus, it is possible to produce a steering wheel of the present invention by a normal injection molding of polyurethane, except in that a process for producing the polyurethane member is adjusted such that the polyurethane member has a specific gravity of 0.7 to 0.9 and a Shore A hardness of 45 to 60, as explained in the following.

It is possible to make the polyurethane member have a specific gravity of 0.7 to 0.9 by adjusting the amount of a gas generated from a urethane raw material to 0.8-1.5 liters, preferably 1.0-1.3 liters, per kilogram of the urethane raw material. This adjustment can be made by suitably setting the amount of a foaming agent in the urethane raw material. If it is less than 0.8 liters per that, foaming may become insufficient. This may result in an incomplete filling during the injection molding. If it is greater than 1.5 liters per that, specific gravity of the polyurethane member may become too low.

The urethane raw material may be defined, for example, as a combination of (a) a polyol material or component containing a polyol and other normal additives (e.g., catalyst, crosslinking agent, foam stabilizer, foaming agent, pigment, and light stabilizer) and (b) a polyisocyanate material or component containing a polyisocyanate, which are mixed together upon producing the polyurethane member.

It is possible to make the polyurethane member have a Shore A hardness of 45 to 60 by adjusting the amount of a crosslinking agent in a polyol or polyol component for preparing the polyurethane member to 3-5 wt %, preferably 4-5 wt %, based on the total weight of the polyol or polyol component. It is possible to provide a driver with a soft touch when the driver grips the steering wheel by having a Shore A hardness of 45 to 60.

In contrast with the present invention, a gas generated from a urethane raw material during the preparation of a conventional polyurethane member of a steering wheel may be about 2 liters per kilogram of the urethane raw material, thereby providing the polyurethane member with a specific gravity of about 0.45-0.55. Furthermore, the amount of a crosslinking agent in a polyol or polyol component for preparing a conventional polyurethane member may be about 6 wt %.

A process for forming a polyurethane member of a steering wheel of the present invention is described in detail in the following. This process can be conducted by an injection molding similar to that used for preparing conventional steering wheels. In the process, a core member is disposed in a cavity formed in dies, and then a polyurethane resin member is formed to cover at least a rim portion of the core member by a reaction injection molding.

In the reaction injection molding, a polyol material or component is mixed with a polyisocyanate material or component. The polyol component may have an exemplary composition of (a) 90-95 parts by weight (e.g., 93 parts by weight) of a trifunctional polyether polyol, (b) 0.2-0.6 parts by weight (e.g., 0.4 parts by weight) of a catalyst, (c) 3-5 parts by weight of a crosslinking agent, (d) 0.2 parts by weight of a foam stabilizer, (e) 0.5 parts by weight of a foaming agent, (f) 0.8 parts by weight of a pigment, and (g) 0.2-0.6 parts by weight (e.g., 0.4 parts by weight) of a light stabilizer. The polyisocyanate material may include 25-45 parts by weight (e.g., 30 parts by weight) of a modified diphenylmethanediisocyanate (MDI).

An air bag cover is attached to the boss portion of a steering wheel of the present invention. An air bag is built in an inside space of the boss portion, which is covered with the air bag cover.

According to the present invention, it is unnecessary to use a weight of 200-300 g that was necessary for obtaining a proper value of moment of inertia in a light-weight steering wheel having a magnesium alloy core member covered with a polyurethane resin having a specific gravity of about 0.6. As compared with a conventional steering wheel having such weight, it is possible to reduce a weight of about 150 g in total by the steering wheel of the present invention using the special polyurethane member having a higher specific gravity of 0.7 to 0.9.

Suppose that a steering wheel is produced by covering a magnesium alloy core member with a conventional polyurethane resin having a specific gravity of about 0.6 with no weight to the magnesium alloy core member. This steering wheel is the best in term of weight reduction. However, it becomes improper or too low in moment of inertia. Thus, there may arise the occurrence of a malfunction of steering wheel, such as circumferential vibration. In the case of using a conventional core member made of cast iron, it is not necessary to use a weight. The resulting steering wheel, however, becomes too heavy in weight.

In the present invention, the weight of the steering wheel proper can be 1.5 to 1.8 kg by using a magnesium alloy core member. In contrast with the present invention, the weight of a steering wheel proper having a core member made of iron and aluminum is 2.0 to 2.2 kg, and that having a core member totally made of cast iron is 2.5 to 3.0 kg.

Although the invention was explained by the above embodiment, the present invention is not limited to the above embodiment. A scope obvious from the invention concept disclosed in the specification and the drawings is also included therein. Thus, the invention is defined only by the attached claims.

The entire contents of basic Japanese Patent Application 2006-197567 (filed Jul. 20, 2006), of which priority is claimed in the present application, are incorporated herein by reference.

What is claimed is:

1. A steering wheel comprising:
   a core member having a boss portion, a spoke portion, and a rim portion, the spoke portion stretching between the boss portion and the rim portion; and
   a polyurethane member covering at least the rim portion of the core member, the polyurethane member having a specific gravity of 0.7 to 0.9 and a Shore A hardness of 45 to 60,
   wherein a steering wheel proper defined as being a combination of the core member and the polyurethane member has a weight of 1.0 to 2.5 kg.

2. A steering wheel according to claim 1, wherein the core member is made of a magnesium alloy.

3. A steering wheel according to claim 1, wherein the polyurethane member is prepared by a process in which a gas generated from a urethane raw material is adjusted to 0.8-1.5 liters per kilogram of the urethane raw material, and wherein a crosslinking agent in a polyol component is in an amount of 3 to 5 wt %, based on a total weight of the polyol component.

4. A steering wheel according to claim 3, wherein the urethane raw material is defined as a combination of the polyol component and a polyisocyanate component, which are mixed together upon producing the polyurethane member.

5. A steering wheel according to claim 3, wherein the gas is adjusted to 1.0 to 1.3 liters per kilogram of the urethane raw material.

6. A steering wheel according to claim 3, wherein the crosslinking agent in the polyol component is in an amount of 4 to 5 wt %.

7. A steering wheel according to claim 3, wherein the polyol component comprises a trifunctional polyether polyol.

8. A steering wheel according to claim 3, the polyol component comprises a catalyst, a foam stabilizer, a foaming agent, a pigment, and a light stabilizer.

9. A steering wheel according to claim 1, wherein the steering wheel proper has a weight of 1.5 to 1.8 kg.

* * * * *